(12) United States Patent
Sennett et al.

(10) Patent No.: US 8,265,590 B2
(45) Date of Patent: Sep. 11, 2012

(54) PROVIDING INFORMATION PERTAINING TO USAGE OF A MOBILE WIRELESS COMMUNICATIONS DEVICE

(75) Inventors: DeWayne A. Sennett, Redmond, WA (US); Brian K. Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 229 days.

(21) Appl. No.: 12/572,450

(22) Filed: Oct. 2, 2009

(65) Prior Publication Data

US 2011/0081885 A1    Apr. 7, 2011

(51) Int. Cl.
*H04M 11/00* (2006.01)
*H04W 24/00* (2009.01)

(52) U.S. Cl. .................. 455/405; 455/456.1; 455/456.2; 455/456.3

(58) Field of Classification Search .................. 455/405, 455/456.1–456.6
See application file for complete search history.

(56) References Cited

U.S. PATENT DOCUMENTS

| | | | |
|---|---|---|---|
| 6,484,029 B2 * | 11/2002 | Hughes et al. ................ 455/434 |
| 7,697,942 B2 * | 4/2010 | Stevens ...................... 455/456.1 |
| 7,860,516 B2 * | 12/2010 | Hodges et al. ............. 455/456.1 |
| 2002/0093953 A1 * | 7/2002 | Naim et al. .................... 370/386 |
| 2002/0128000 A1 * | 9/2002 | do Nascimento, Jr. ....... 455/414 |
| 2003/0134645 A1 * | 7/2003 | Stern et al. .................... 455/456 |
| 2007/0072616 A1 * | 3/2007 | Irani ............................. 455/441 |
| 2008/0299900 A1 * | 12/2008 | Lesyna ........................ 455/26.1 |
| 2009/0253427 A1 * | 10/2009 | Fukushima et al. ........ 455/432.1 |
| 2010/0167716 A1 * | 7/2010 | Howarter et al. ............ 455/419 |
| 2010/0227629 A1 * | 9/2010 | Cook et al. ................. 455/456.4 |

* cited by examiner

*Primary Examiner* — Nathan Mitchell
(74) *Attorney, Agent, or Firm* — Woodcock Washburn LLP

(57) ABSTRACT

When a device, such as a cellular phone, enters into a region, usage information pertaining to usage of devices in the region is provided to the device. For example, restrictions pertaining to usage of cellular phones while driving can be provided. Usage information also can be provided upon request or in accordance with various factors, such as subscriber preferences, elapsed time since the last time usage information was sent to the device, elapsed time since usage regulations have been enacted or updated, and/or the frequency of which the device is in the region. A region can include a geographic region, a political boundary, a country, a state, a municipality, a county, a parish, a township, a building (e.g., school, library, movie theatre, court house, local, state, or federal government building), a public place (e.g., restaurant, bus, train, taxi), a zip code, a telephone area code, or the like.

20 Claims, 6 Drawing Sheets

PROVIDING INFORMATION PERTAINING TO USAGE OF A MOBILE WIRELESS COMMUNICATIONS DEVICE

BACKGROUND

An increasing number of municipalities and states have been enacting legislation regarding the usage of mobile wireless communications devices, such as cellular phones. Many of these restrictions are related to restrictions on the usage of cellular phones for calls or text messages while driving. However, other restrictions pertain to use of a cellular phone in other locations, such as use of text messages or use of camera capabilities in a library or school, for example.

As subscribers roam to different regions of the country, these subscribers may be entering areas with potentially different regulations pertaining to the use of cellular phones. The subscribers may not be familiar with these regulations, especially if they are visiting a new location or an infrequently visited location.

SUMMARY

Information pertaining to the use of mobile wireless communications devices in a region are provided to a mobile wireless communications device. In example embodiments, the information is provided upon the occurrence of an event, such as when the information is requested or when the mobile wireless communications device enters the region. The information can be provided in accordance with subscriber preferences. For example, if a subscriber commutes between two states every work day, the subscriber may decide not to receive information pertaining to the usage of mobile wireless communications devices in the regions (e.g., states in this case) unless restrictions pertaining to the usage have changed. Usage information can be provided depending upon the amount of time that has elapsed since the last time usage information was sent to the mobile wireless communications device, the amount of time that has elapsed since usage regulations have been enacted or updated, or depending upon the frequency (rate of recurrence) of which the mobile wireless communications device is in the region. A region can include any appropriate region having restrictions/regulation pertaining to usage of a mobile wireless communications device, such as for example, a geographic region, a political boundary, a country, a state, a municipality, a county, a parish, a township, a building (e.g., school, library, movie theatre, court house, local, state, or federal government building), a public place (e.g., restaurant, bus, train, taxi), a zip code, a telephone area code, or the like.

DETAILED DESCRIPTION OF ILLUSTRATIVE EMBODIMENTS

Figure 1:
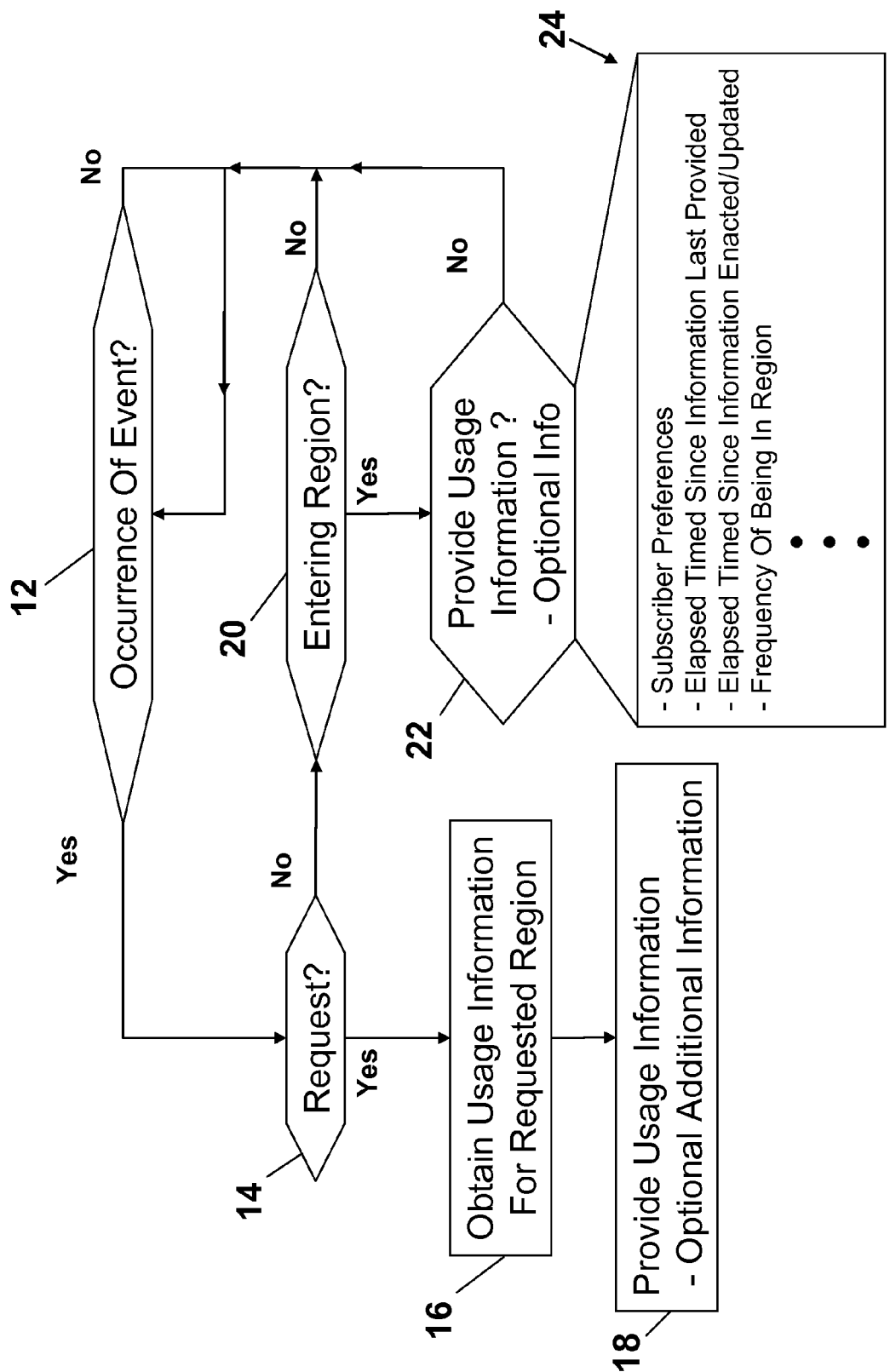
FIG. 1 is a flow diagram depicting an example process for providing information to a mobile wireless communications device pertaining to usage of a mobile wireless communications device.

FIG. 1 is a flow diagram depicting an example process for providing information to a mobile wireless communications device pertaining to usage of a mobile wireless communications device. At step 12 it is determined if an event has occurred. The event can be any appropriate event that can trigger the provision of usage information to a mobile wireless communications device. In example embodiments the event can be a request for usage information as depicted at step 14, the mobile wireless communications device entering into the region as depicted at step 20, or a combination thereof. If the event is a request (step 14) for usage information in a region, the usage information for that region is obtained at step 16, and the usage information if provided at step 18. Additional information pertaining to compliance of usage of the mobile wireless communications device in the region, optionally, also can be provided at step 18.

For example, a subscriber who lives in Philadelphia and has a trip scheduled to the Seattle area may want to retrieve cellular phone usage restriction information pertaining to Seattle before departing on her trip. Thus, the subscriber can receive the usage information (e.g., driving restrictions, usage restrictions pertaining to a state, a municipality, a county, a parish, a township, a building, e.g., school, library, movie theatre, court house, local, state, or federal government building, public places, e.g., restaurant, bus, train, telephone area code, zip code, or the like), and can be made aware of any ancillary equipment that may facilitate compliance, such as, for example, a hands-free kit to allow use of a mobile wireless communications device while driving. The subscriber could be provided, for example, links to sources that sell ancillary equipment. Optional information can include any information pertaining to the usage information. For example, optional information can include any registration information that may be applicable to use of a mobile wireless communications device in a particular region, such as a school, court house, or the like. Optional information can include a history of the enactment of usage regulations/restrictions in a particular region.

In various embodiments, this on demand retrieval of usage information can be obtained via the mobile wireless communications device, via a processor/server/computer, and/or via a web browser on the mobile wireless communications device or processor/server/computer. The subscriber can identify the region in any appropriate manner. For example, the subscriber can identify the region (e.g., desired location) via a current location, an airport code, a city name, a state name, a municipality name, a county name, a building name (e.g., court house, restaurant), a zip code, a telephone area code, a school district, a municipality, a transportation provider, or the like.

If the event is not a request (step 14) for usage information, the process proceeds to step 20. At step 20, it is determined if the mobile wireless communications device is entering a region. If not, the process proceeds back to step 12. If it is determined (step 20) that the mobile wireless communications device is entering a region, it is determined, at step 22, if usage information and, optionally, additional information is to be provided to the mobile wireless communications device. As described previously, examples of optional information can include registration information, enactment history, and/or information pertaining to any ancillary equipment that may facilitate compliance with the use of mobile wireless communications devices in the region, such as, for example, a hands-free kit to allow use of a mobile wireless communications device while driving. The subscriber could be provided, for example, links to sources that sell ancillary equipment. The determination as to whether usage information/additional information is to be provided to the mobile wireless communications device can be accomplished in accordance with various factors, as depicted in block 24.

For example, the determination as to whether usage information/additional information is to be provided to the mobile wireless communications device can be accomplished in accordance subscriber preferences. Thus, if the subscriber associated with the mobile wireless communications device does not want usage information, no usage information will be provided. The subscriber could limit the type of usage information desired, such as, usage information pertaining only to use of mobile wireless communications devices while driving, use of mobile wireless communications devices within a particular region, or the like. As another example, the subscriber may want usage information only when usage information has changed. When the subscriber changes location, the subscriber's location can be updated in the network (e.g., VLR, HLR—described in more detail below). When the subscriber's location is updated, a server in the next location could be given the subscriber's new location and old location to determine if the subscriber has crossed into a region with different cellular phone usage regulations. If the subscriber has moved into a region with different cellular phone usage regulations, the subscriber could be sent information about these regulations.

As another example, the determination as to whether usage information/additional information is to be provided to the mobile wireless communications device can be accomplished in accordance the amount of time that has elapsed since usage information for the region was provided to the mobile wireless communications device. Thus, if a subscriber moves in and out of two regions during her commute to and from work (e.g., subscriber lives in Washington state and works in Oregon), a threshold time period (e.g., two weeks) could be established such that usage information/additional information would be provided to the mobile wireless communications device if it has been more than the threshold amount of time since usage information/additional information was previously sent to the mobile wireless communications device. Otherwise, no usage information/additional information would be provided.

As yet another example, the determination as to whether usage information/additional information is to be provided to the mobile wireless communications device can be accomplished in accordance the amount of time that has elapsed since regulations or the like pertaining to the use of mobile wireless communications devices in the region have been enacted and/or updated. Thus, if new regulations were enacted and/or if existing regulations were updated since the previous time usage information was provided to the mobile wireless communications device, when the subscriber enters a region, usage information/additional information would be provided to the mobile wireless communications device. If no new regulations were enacted and/or if no existing regulations were updated since the previous time usage information was provided to the mobile wireless communications device, when the subscriber enters a region, no usage information/additional information would be provided to the mobile wireless communications device In another example embodiment, if a subscriber's preferences so indicate, when new regulations are enacted and/or when existing regulations are updated, the new/updated usage information could be provided to the mobile wireless communications device regardless of the location of the mobile wireless communications device.

As a further example, the determination as to whether usage information/additional information is to be provided to the mobile wireless communications device can be accomplished in accordance with the frequency (rate of recurrence) of which the mobile wireless communications device is in the region. This could apply to the commuter scenario, in which the subscriber enters the region five times per week. Thus, a threshold frequency value could be established, such that usage information/additional information would be provided to the mobile wireless communications device if the frequency is less than the threshold frequency. Otherwise, no usage information/additional information would be provided. As a subscriber enters the region, the average frequency can be determined over a given time period (e.g., one month). If the average frequency is less than the threshold frequency, usage information/additional information would be provided. If the average frequency is great than or equal to the threshold frequency, usage information/additional information would not be provided. Thus, in the above described example scenario, if the average frequency determined over the previous month is less than five times per week, usage information/additional information would be provided to the mobile wireless communications device. If the average frequency determined over the previous month is greater than or equal to five times per week, usage information/additional information would not be provided to the mobile wireless communications device.

It is to be understood, that the sequence of steps as depicted in FIG. 1 is exemplary and is not intended to be limiting. For example, the performance of step 14 and step 20 could be reversed such that a determination of whether the mobile wireless communications device is entering a region could be accomplished before determining if a request for usage information was made. It also is to be understood that the process depicted in FIG. 1 can be construed to depict an embodiment in which only a determination as to whether the mobile wireless communications device is entering a region is accomplished, and that no determination of receiving a request for usage information is made. Further, the list of factors in block 24 is exemplary and not intended to be limiting.

Usage information/additional information can be provided in any appropriate format. For example, usage information/additional information can comprise an SMS message, a link to a web page (accessible by the mobile wireless communications device or a PC-like computer), a pre-recorded audio message, a video message, an email message, a multimedia message, or the like.

In an example embodiment, the determination that the mobile wireless communications device is entering a region is performed via any appropriate location determination mechanism. For example, the location of the mobile wireless communications device can be determined using any known mechanisms/methodology including the global positioning system (GPS), assisted global positioning systems (A-GPS), time delay of arrival (TDOA), round trip timing delay, triangulation, via an identifier of a cellular site servicing the mobile communications device, via a radio access network, via any appropriate network identifier, and/or any other method used to determine the location of mobile wireless communications device.

Figure 2:
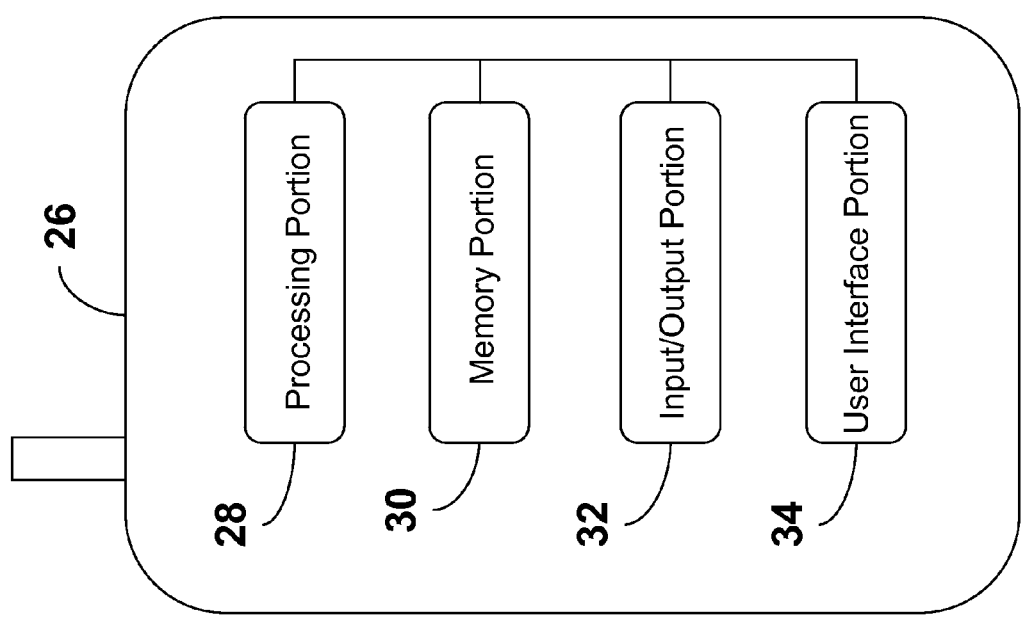
FIG. 2 is a block diagram of an example mobile wireless communications device configured to receive information pertaining to usage of a mobile wireless communications device.

FIG. 2 is a block diagram of an example mobile wireless communications device 26 configured to receive information pertaining to usage of a mobile wireless communications device. The mobile wireless communications device 26 can comprise any appropriate portable device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The mobile wireless communications device 26 can include devices that are not typically thought of as portable, such as, for example, a public computing device, a navigation device installed in-vehicle, a set top box, or the like. The mobile wireless communications device 26 can include non-conventional computing devices, such as, for example, a motor vehicle control (e.g., steering wheel), etc., or the like.

The mobile wireless communications device 26 can include any appropriate device, mechanism, software, and/or hardware for receiving information pertaining to usage of a mobile wireless communications device as described herein. In an example configuration, the mobile wireless communications device 26 comprises a processing portion 28, a memory portion 30, an input/output portion 32, and a user interface (UI) portion 34. It is emphasized that the block diagram depiction of mobile wireless communications device 26 is exemplary and not intended to imply a specific implementation and/or configuration. For example, in an example configuration, the mobile wireless communications device 26 comprises a cellular phone and the processing portion 28 and/or the memory portion 30 are implemented, in part or in total, on a subscriber identity module (SIM) of the mobile wireless communications device 26. In another example configuration, the mobile wireless communications device 26 comprises a laptop computer. The laptop computer can include a SIM, and various portions of the processing portion 28 and/or the memory portion 30 can be implemented on the SIM, on the laptop other than the SIM, or any combination thereof.

The processing portion 28, memory portion 30, and input/output portion 32 are coupled together to allow communications therebetween. In various embodiments, the input/output portion 32 comprises a receiver of the mobile wireless communications device 26, a transmitter of the mobile wireless communications device 26, or a combination thereof. The input/output portion 32 is capable of receiving and/or providing information pertaining to usage of a mobile wireless communications device as described above. In an example embodiment, the input/output portion 32 is capable of receiving information to determine a location of the mobile wireless communications device 26. In an example configuration, the input\output portion 32 comprises a GPS receiver. In various configurations, the input/output portion 32 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

In an example embodiment, if the mobile wireless communications device 26 determines that the mobile wireless communications device 26 is to receive usage information, the mobile wireless communications device 26, via the input/output portion 32, provides a request for the usage information to an appropriate network entity (or entities), such as a server, database, or the like. The appropriate network entity receives the request, and responsive thereto provides the usage information to the mobile wireless communications device 26. If the mobile wireless communications device 26 determines that the mobile wireless communications device 26 is not to receive usage information, the mobile wireless communications device 26 receives no usage information. If the mobile wireless communications device 26 is to receive usage information only if usage information changes, when the mobile wireless communications device 26 enters a region, the mobile wireless communications device 26, via the input/output portion 32, can provide, to the appropriate network entity, a request for the usage information if usage information has changed. If usage information has changed, the appropriate network entity, responsive to receiving the request, provides the usage information to the mobile wireless communications device 26. If the usage information has not changed, the appropriate network entity can provide no usage information or provide an indication that the usage information has not changed.

Usage information and usage information status can be provided to the mobile wireless communication device via any appropriate mechanism(s). In an example scenario, the initial provisioning can be performed via a web page interface from either the mobile wireless communications device or via another PC connection. The usage information that is sent to the mobile wireless communications device can be tagged with version information such as version number, last updated date and time, etc. The mobile wireless communications device can request from the server in the network, the version information of the usage information on the server. If the usage information on the server is newer than the usage information on the mobile wireless communications device, the mobile wireless communications device can initiate a data session to retrieve the updated usage information from the server in the network.

The processing portion 28 is capable of performing functions pertaining to usage of a mobile wireless communications device as described above. For example, the processing portion 28 is capable of determining the type of event that has occurred, such as whether the event was a request for usage information or the mobile wireless communications device 26 entering a region, as described above. The processing portion 28 is capable of determining a location of the mobile wireless communications device 26. The processing portion 28 is capable of determining whether usage information is to be provided, as described above. The processing portion 28 is capable of determining and analyzing the various factors, including but not limited to subscriber preferences, elapsed time since user information was last provided, elapsed time since user information was enacted/updated, and/or the frequency of which the mobile wireless communications device is in a region, to determine whether usage information is to be provided, as described above.

In a basic configuration, the mobile wireless communications device 26 can include at least one memory portion 30. The memory portion 30 can store any information utilized in conjunction with providing and/or receiving usage/optional information pertaining to usage of a mobile wireless communications device as described above. For example, the memory portion 30 is capable of storing information pertaining to a location of the mobile wireless communications device, information pertaining to a definition of a region, information pertaining to use of a mobile wireless communications device in a region, information pertaining to subscriber preferences, information pertaining to elapsed time since user information was last provided, information pertaining to elapsed time since user information was enacted/updated, and information pertaining to frequency of which the mobile wireless communications device is in a region, as described above. Depending upon the exact configuration and type of processor, the memory portion 30 can be volatile (such as some types of RAM), non-volatile (such as ROM, flash memory, etc.), or a combination thereof. The mobile wireless communications device 26 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile wireless communications device 26.

The mobile wireless communications device 26 also can contain a UI portion 34 allowing a user to communicate with the mobile wireless communications device 26. The UI portion 34 can provide the ability to control the mobile wireless communications device 26, via, for example, buttons, soft keys, voice actuated controls, a touch screen, movement of the mobile wireless communications device 26, visual cues (e.g., moving a hand in front of a camera on the mobile wireless communications device 26), or the like. The UI portion 34 can provide visual information (e.g., via a display), audio information (e.g., via speaker), mechanically (e.g., via a vibrating mechanism), or a combination thereof. In various configurations, the UI portion 34 can comprise a display, a touch screen, a keyboard, an accelerometer, a motion detector, a speaker, a microphone, a camera, a tilt sensor, or any combination thereof. The UI portion 34 can comprise means for inputting biometric information, such as, for example, fingerprint information, retinal information, voice information, and/or facial characteristic information.

Figure 3:
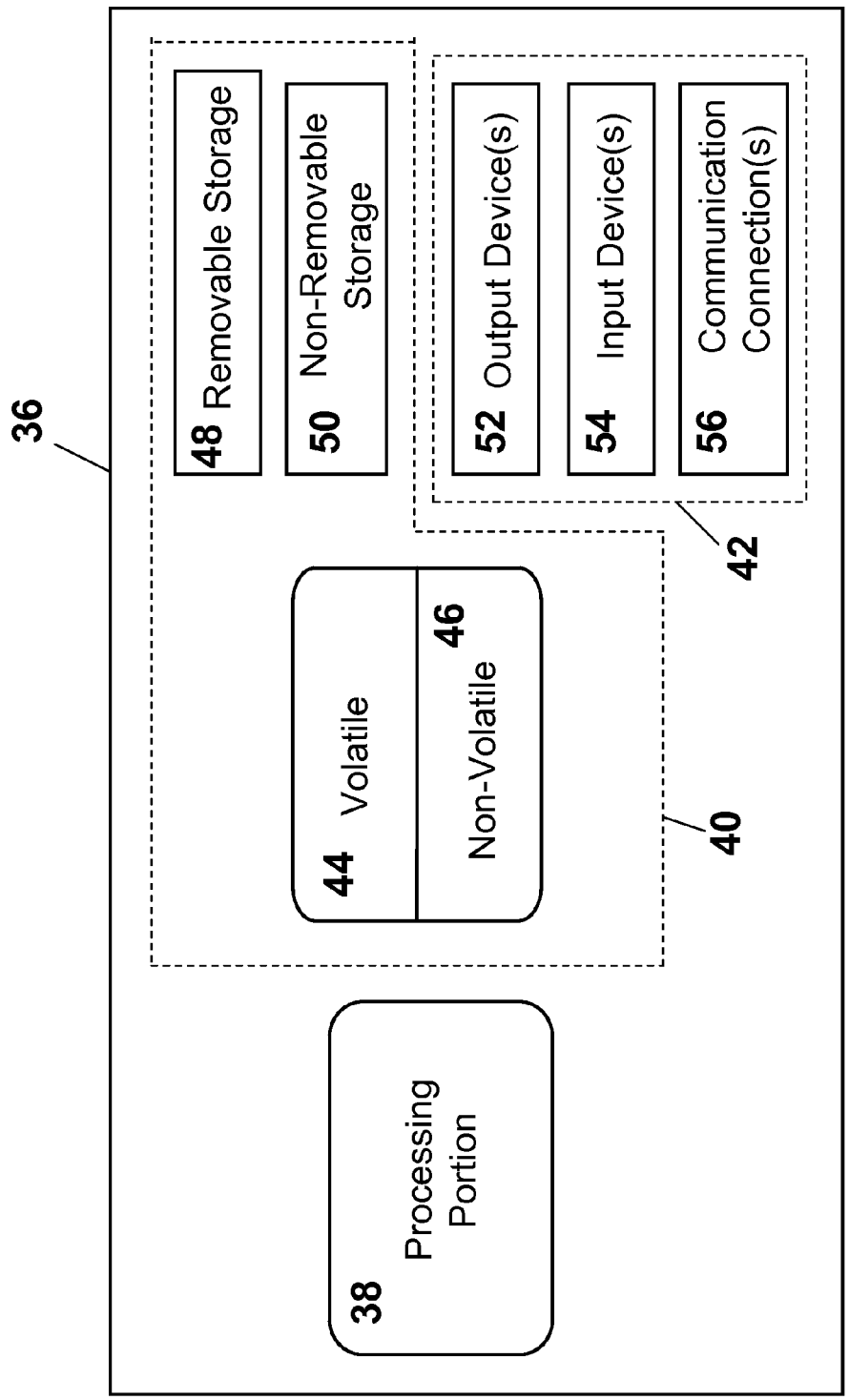
FIG. 3 is a block diagram of an example system configured to provide information to a mobile wireless communications device pertaining to usage of a mobile wireless communications device.

FIG. 3 is a block diagram of an example system 36 for providing information to a mobile wireless communications device pertaining to usage of a mobile wireless communications device. The system 36 depicted in FIG. 3 represents any appropriate network entity, such as a processor, a server, a gateway, or the like, and any combination thereof. In an example configuration, the system 36 comprises a component or various components of a cellular broadcast system wireless network. It is emphasized that the block diagram depicted in FIG. 3 is exemplary and not intended to imply a specific implementation or configuration. Thus, the system 36 can be implemented in a single processor or multiple processors (e.g., single server or multiple servers, single gateway or multiple gateways). The system 36 can be distributed, centrally located, and/or integrated. Multiple components of the system 36 can communicate wirelessly, via hard wire, or a combination thereof.

In an example configuration, the system 36 comprises a processing portion 38, a memory portion 40, and an input\output portion 42. The processing portion 38, memory portion 40, and input\output portion 42 are coupled together (coupling not shown in FIG. 3) to allow communications therebetween. The input\output portion 42 is capable of receiving and/or providing information pertaining to usage of a mobile wireless communications device as described above. In an example embodiment, the input/output portion 42 is capable of receiving information to determine a location of the mobile wireless communications device 26, and to provide location information to the mobile wireless communications device 26. In an example configuration, the input\output portion 32 comprises a GPS receiver. In various configurations, the input/output portion 42 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 38 is capable of performing functions pertaining to usage of a mobile wireless communications device as described above. For example, the processing portion 38 is capable of determining the type of event that has occurred, such as whether the event was a request for usage information or the mobile wireless communications device 26 entering a region, as described above. The processing portion 38 is capable of determining a location of the mobile wireless communications device 26 and processing location information for provision to the mobile wireless communications device 26. The processing portion 38 is capable of determining whether usage information is to be provided, as described above. The processing portion 38 is capable of determining and analyzing the various factors, including but not limited to subscriber preferences, elapsed time since user information was last provided, elapsed time since user information was enacted/updated, and/or the frequency of which the mobile wireless communications device is in a region, to determine whether usage information is to be provided, as described above.

In a basic configuration, the system 36 can include at least one memory portion 40. The memory portion 40 can store any information utilized in conjunction with providing and/or receiving usage/optional information pertaining to usage of a mobile wireless communications device as described above. For example, the memory portion 40 s capable of storing information pertaining to a location of the mobile wireless communications device, information pertaining to a definition of a region, information pertaining to use of a mobile wireless communications device in a region, information pertaining to subscriber preferences, information pertaining to elapsed time since user information was last provided, information pertaining to elapsed time since user information was enacted/updated, and information pertaining to frequency of which the mobile wireless communications device is in a region, as described above. Depending upon the exact configuration and type of system 36, the memory portion 40 can include computer readable storage media that is volatile 44 (such as some types of RAM), non-volatile 46 (such as ROM, flash memory, etc.), or a combination thereof. The system 36 can include additional storage, in the form of computer readable storage media (e.g., removable storage 48 and/or non-removable storage 50) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the system 36.

The system 36 also can contain communications connection(s) 56 that allow the system 36 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and communication media. The system also can have input device(s) 54 such as keyboard, mouse, pen, voice input device, touch input device, etc. Output device(s) 52 such as a display, speakers, printer, etc. also can be included.

Figure 4:
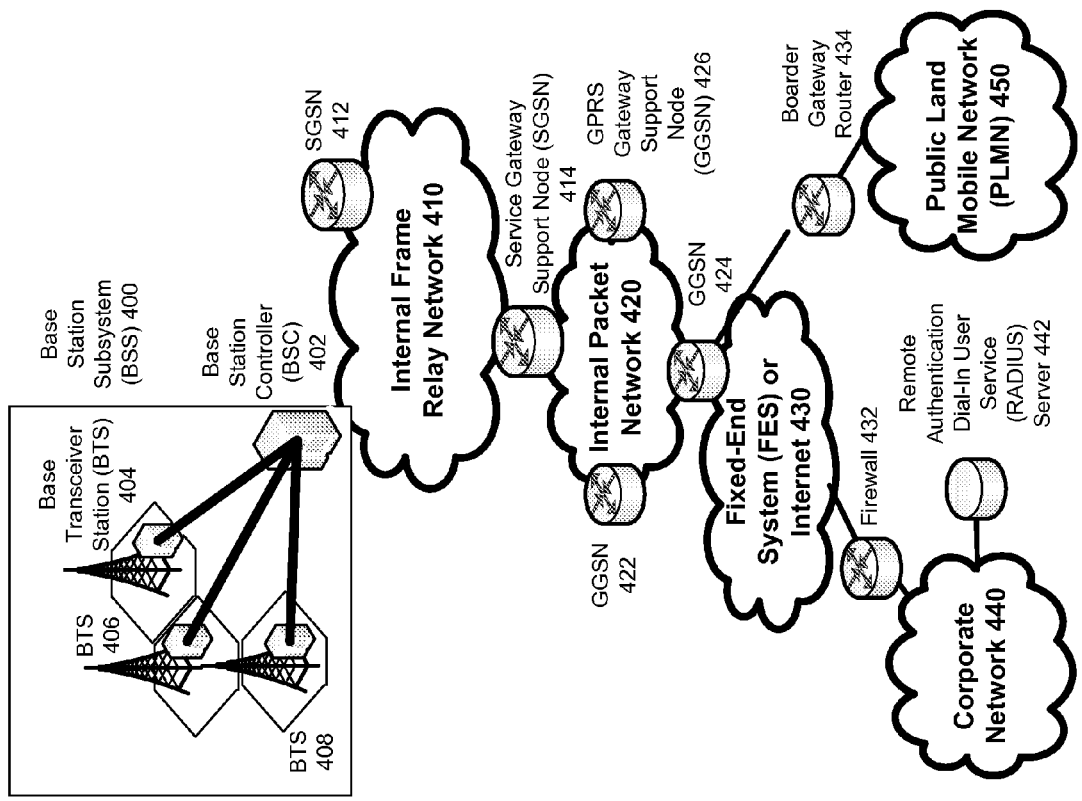
FIG. 4 depicts a block diagram of an exemplary packet-based mobile cellular network environment, such as a GPRS network, in which information pertaining to usage of a mobile wireless communications device can be received and provided.

FIG. 4 depicts an overall block diagram of an exemplary packet-based mobile cellular network environment, such as a GPRS network, in which information pertaining to usage of a mobile wireless communications device can be received and provided. Note, the system 36 depicted in FIG. 3 can comprise any appropriate component of combination of components of the network depicted in FIG. 4. In the exemplary packet-based mobile cellular network environment shown in FIG. 4, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 5:
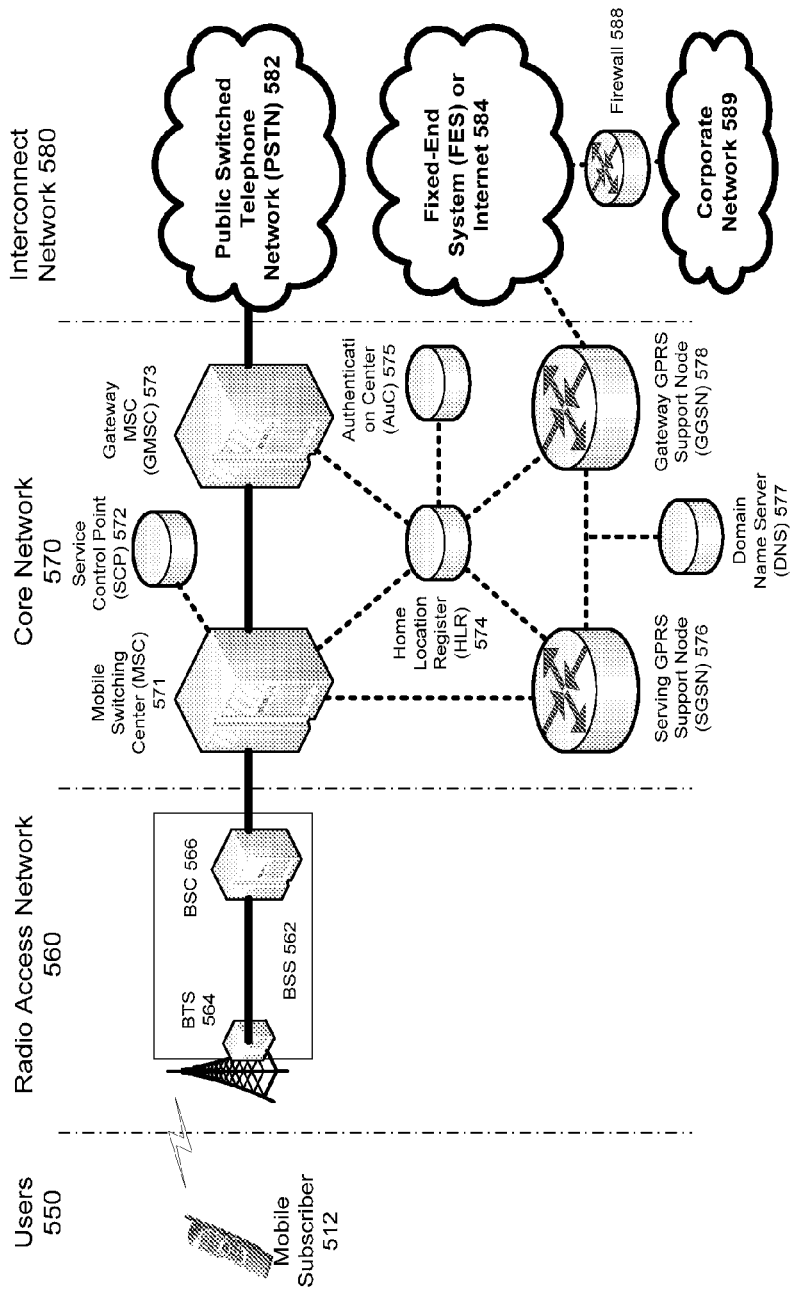
FIG. 5 illustrates an architecture of a typical GPRS network in which information pertaining to usage of a mobile wireless communications device can be received and provided.

FIG. 5 illustrates an architecture of a typical GPRS network in which information pertaining to usage of a mobile wireless communications device can be received and provided. Note, the system 36 depicted in FIG. 3 can comprise any appropriate component of combination of components of the network depicted in FIG. 5. The architecture depicted in FIG. 5 is segmented into four groups: users 550, radio access network 560, core network 570, and interconnect network 580. Users 550 comprise a plurality of end users. Note, device 512 is referred to as a mobile subscriber in the description of network shown in FIG. 5. In an example embodiment, the device depicted as mobile subscriber 512 comprises a mobile device (e.g., mobile wireless communications device 26). Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 5, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device (e.g., mobile wireless communications device 26), used by an end user of the mobile cellular service. When a mobile subscriber turns on his or her mobile device, the mobile device goes through an attach process by which the mobile device attaches to an SGSN of the GPRS network. In FIG. 5, when mobile subscriber 512 initiates the attach process by turning on the network capabilities of the mobile device, an attach request is sent by mobile subscriber 512 to SGSN 576. The SGSN 576 queries another SGSN, to which mobile subscriber 512 was attached before, for the identity of mobile subscriber 512. Upon receiving the identity of mobile subscriber 512 from the other SGSN, SGSN 576 requests more information from mobile subscriber 512. This information is used to authenticate mobile subscriber 512 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 512 was attached before, to cancel the location process for mobile subscriber 512. HLR 574 then notifies SGSN 576 that the location update has been performed. At this time, SGSN 576 sends an Attach Accept message to mobile subscriber 512, which in turn sends an Attach Complete message to SGSN 576.

After attaching itself with the network, mobile subscriber 512 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 512. The mobile subscriber 512 uses an algorithm to send the user identification (ID) and password to SGSN 576. The SGSN 576 uses the same algorithm and compares the result. If a match occurs, SGSN 576 authenticates mobile subscriber 512.

Next, the mobile subscriber 512 establishes a user session with the destination network, corporate network 589, by going through a Packet Data Protocol ("PDP") activation process. Briefly, in the process, mobile subscriber 512 requests access to the Access Point Name ("APN"), for example, UPS.com, and SGSN 576 receives the activation request from mobile subscriber 512. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 512.

Once activated, data packets of the call made by mobile subscriber 512 can then go through radio access network 560, core network 570, and interconnect network 580, in a particular fixed-end system or Internet 584 and firewall 588, to reach corporate network 589.

Figure 6:
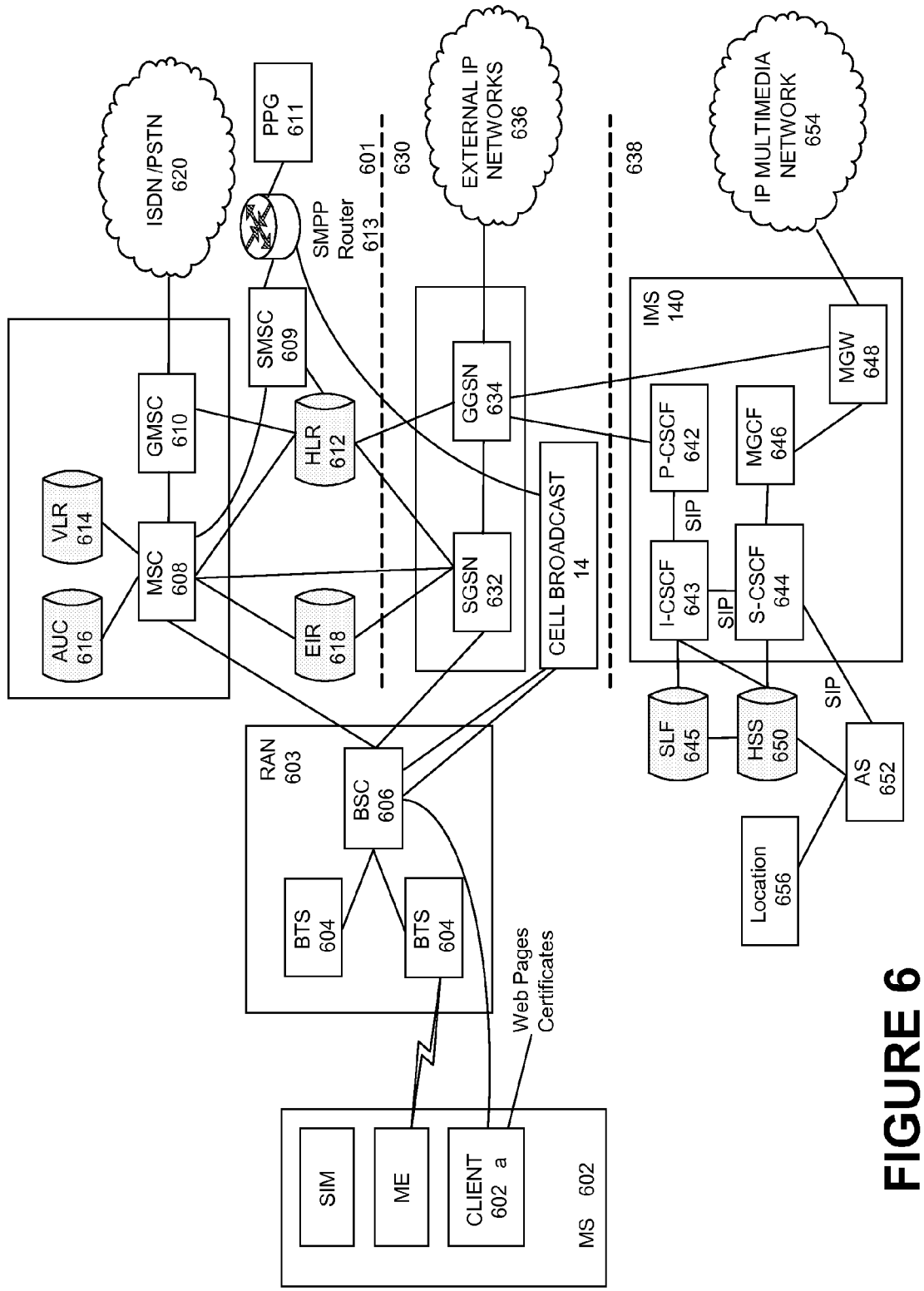
FIG. 6 illustrates an exemplary block diagram view of a GSM/GPRS/IP multimedia network architecture within which information pertaining to usage of a mobile wireless communications device can be received and provided.

FIG. 6 illustrates an exemplary block diagram view of a GSM/GPRS/IP multimedia network architecture 600 within which information pertaining to usage of a mobile wireless communications device can be received and provided. Note, the system 36 depicted in FIG. 3 can comprise any appropriate component of combination of components of the network depicted in FIG. 6. As illustrated, architecture 600 of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of providing usage information pertaining to usage of a mobile wireless communications device to a wireless mobile communications device have been described in connection with various computing devices/processor, the underlying concepts can be applied to any computing device, processor, or system capable of providing and/or receiving usage information pertaining to usage of a mobile wireless communications device. The various techniques described herein can be implemented in connection with hardware or software or, where appropriate, with a combination of both. Thus, the methods and apparatuses for providing usage information pertaining to usage of a mobile wireless communications device to a mobile wireless communications device, or certain aspects or portions thereof, can take the form of program code (i.e., instructions) embodied in tangible storage media, such as floppy diskettes, CD-ROMs, hard drives, or any other machine-readable storage medium, wherein, when the program code is loaded into and executed by a machine, such as a computer, the machine becomes an apparatus for providing and/or receiving usage information pertaining to usage of a mobile wireless communications device. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for providing and/or receiving usage information pertaining to usage of a mobile wireless communications device also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of on-demand spam reporting. When implemented on a general-purpose processor, the program code combines with the processor to provide a unique apparatus that operates to invoke the functionality of providing and/or receiving usage information pertaining to usage of a mobile wireless communications device. Additionally, any storage techniques used in connection with the utilization of providing and/or receiving usage information pertaining to usage of a mobile wireless communications device can invariably be a combination of hardware and software.

While providing usage information pertaining to usage of a mobile wireless communications device to a mobile wireless communications device has been described in connection with the various embodiments of the various figures, it is to be understood that other similar embodiments can be used or modifications and additions can be made to the described embodiment for performing the same function of providing usage information pertaining to usage of a mobile wireless communications device to a mobile wireless communications device without deviating therefrom. For example, one skilled in the art will recognize that providing usage information pertaining to usage of a mobile wireless communications device to a mobile wireless communications device as described in the present application may apply to any environment, whether wired or wireless, and may be applied to any number of such devices connected via a communications network and interacting across the network. Therefore, providing usage information pertaining to usage of a mobile wireless communications device to a mobile wireless communications device should not be limited to any single embodiment, but rather should be construed in breadth and scope in accordance with the appended claims.

What is claimed:

1. A method comprising:
    upon occurrence of an event, determining whether usage information pertaining to usage of mobile wireless communications devices in a region is to be provided to a mobile wireless communications device; and
    when it is determined that the usage information is to be provided, providing the usage information to the mobile wireless communications device based on:
        an amount of time that has elapsed since information pertaining to usage of mobile wireless communications devices in the region has been provided to the mobile wireless device; and
        an amount of time that has elapsed since information pertaining to usage of mobile wireless communications devices in the region has been enacted or updated.

2. The method in accordance with claim 1, wherein the event comprises one of:
    a request for the usage information; or
    a determination that the mobile wireless communications device is entering into the region.

3. The method in accordance with claim 2, further comprising:
    determining that the mobile wireless communications device is entering into the region via at least one of:
        a global positioning system;
        an assisted global position system; or
        an identifier of a radio access network servicing the mobile communications device.

4. The method in accordance with claim 3, wherein the mobile wireless communications device comprises a global positioning system receiver.

5. The method in accordance with claim 2, wherein when it is determined that the mobile wireless communications device is entering into the region, the method further comprising:
    determining whether usage of mobile wireless communications devices in the region differs from usage of mobile wireless communications devices in another region; and
    when it is determined that usage of mobile wireless communications devices in the region does not differ from usage of mobile wireless communications devices in the other region, performing one of:
        providing no usage information pertaining to usage of mobile wireless communications devices in the region to the mobile wireless communications device; or
        providing an indication that the usage information has not changed; and
    when it is determined that usage of mobile wireless communications devices in the region differs from usage of mobile wireless communications devices in the other region, providing the usage information pertaining to usage of mobile wireless communications devices in the region to the mobile wireless communications device.

6. The method in accordance with claim 1, wherein the usage information further comprises information pertaining to equipment available to facilitate compliance with usage of mobile wireless communications devices in the region.

7. The method in accordance with claim 1, further comprising providing the usage information via at least one of:
    an audible message;
    a text message;
    a video message; or
    a link to a message.

8. The method in accordance with claim 1, wherein it is determined whether the information is to be provided to the mobile wireless communications device further based on at least one of:
    a preference of a subscriber associated with the mobile device; or
    a rate of recurrence in which the mobile wireless communications device is in the region.

9. A system comprising:
    a processing portion configured to:
        upon occurrence of an event, determine whether usage information pertaining to usage of mobile wireless communications devices in a region is to be provided to a mobile wireless communications device; and
    an input/output portion configured to:
        when it is determined that the usage information is to be provided, provide the usage information to the mobile wireless communications device based on a rate of recurrence in which the mobile wireless communications device is in the region.

10. The system in accordance with claim 9, wherein the event comprises one of:
    a request for the usage information; or
    a determination that the mobile wireless communications device is entering into the region.

11. The system in accordance with claim 10, the processing portion further configured to:
   determine that the mobile wireless communications device is entering into the region via at least one of:
      a global positioning system;
      an assisted global position system; or
      an identifier of a radio access network servicing the mobile communications device.

12. The system in accordance with claim 11, wherein the mobile wireless communications device comprises a global positioning system receiver.

13. The system in accordance with claim 11, wherein when it is determined that the mobile wireless communications device is entering into the region:
   the processing portion further configured to:
      determine whether usage of mobile wireless communications devices in the region differs from usage of mobile wireless communications devices in another region; and
   the input/output portion further configured to:
      when it is determined that usage of mobile wireless communications devices in the region does not differ from usage of mobile wireless communications devices in the other region, performing one of:
         providing no usage information pertaining to usage of mobile wireless communications devices in the region to the mobile wireless communications device; or
         providing an indication that the usage information has not changed; and
      when it is determined that usage of mobile wireless communications devices in the region differs from usage of mobile wireless communications devices in the other region, providing the usage information pertaining to usage of mobile wireless communications devices in the region to the mobile wireless communications device.

14. The system in accordance with claim 9, wherein it is determined whether the information is to be provided to the mobile wireless communications device in accordance with at least one of:
   a preference of a subscriber associated with the mobile device;
   an amount of time that has elapsed since information pertaining to usage of mobile wireless communications devices in the region has been provided to the mobile device;
   an amount of time that has elapses since information pertaining to usage of mobile wireless communications devices in the region has been enacted or updated; or
   rate of recurrence in which the mobile wireless communications device is in the region.

15. A mobile wireless communications device comprising:
   a processing portion configured to:
      upon occurrence of an event, determine whether usage information pertaining to usage of mobile wireless communications devices in a region is to be provided to the device;
   an input/portion configured to:
      when it is determined that the usage information is to be provided:
         request the usage information; and
         receive the usage information, wherein the usage information is provided based on:
            an amount of time that has elapsed since information pertaining to usage of mobile wireless communications devices in the region has been provided to the mobile wireless device; and
            an amount of time that has elapsed since information pertaining to usage of mobile wireless communications devices in the region has been enacted or updated.

16. The device in accordance with claim 15, wherein the event comprises one of:
   a request for the usage information; or
   a determination that the mobile wireless communications device is entering into the region.

17. The device in accordance with claim 16, wherein the determination that the mobile wireless communications device is entering into the region is accomplished via at least one of:
   a global positioning system;
   an assisted global position system; or
   an identifier of a radio access network servicing the mobile communications device.

18. The device in accordance with claim 17, wherein the device comprises a global positioning system receiver.

19. The device in accordance with claim 16, wherein when it is determined that the device is entering into the region:
   the processing portion further configured to:
      determine whether usage of mobile wireless communications devices in the region differs from usage of mobile wireless communications devices in another region; and
   the input/output portion further configured to:
      when it is determined that usage of mobile wireless communications devices in the region does not differ from usage of mobile wireless communications devices in the other region, receive one of:
         no usage information pertaining to usage of mobile wireless communications devices in the region to the mobile wireless communications device; or
         receive an indication that the usage information has not changed; and
      when it is determined that usage of mobile wireless communications devices in the region differs from usage of mobile wireless communications devices in the other region, receive the usage information pertaining to usage of mobile wireless communications devices in the region to the mobile wireless communications device.

20. The device in accordance with claim 15, wherein it is determined whether the information is to be provided to the device in accordance with at least one of:
   a preference of a subscriber associated with the mobile device;
   an amount of time that has elapsed since information pertaining to usage of mobile wireless communications devices in the region has been provided to the mobile device;
   an amount of time that has elapses since information pertaining to usage of mobile wireless communications devices in the region has been enacted or updated; or
   rate of recurrence in which the mobile wireless communications device is in the region.

* * * * *